(12) United States Patent
Reddy et al.

(10) Patent No.: US 10,880,881 B2
(45) Date of Patent: Dec. 29, 2020

(54) SYSTEMS AND METHODS FOR COLLISION PREVENTION AND POWER CONSERVATION IN WIRELESS NETWORKS

(71) Applicants: King Fahd University of Petroleum and Minerals, Dhahran (SA); GEORGIA TECH RESEARCH CORPORATION, Atlanta, GA (US)

(72) Inventors: Varun Amar Reddy, Atlanta, GA (US); Gordon Stuber, Atlanta, GA (US); Suhail Aldharrab, Dhahran (SA)

(73) Assignees: King Fahd University of Petroleum and Minerals, Dhahran (SA); GEORGIA TECH RESEARCH CORPORATION, Atlanta, GA (US)

(*) Notice: Subject to any disclaimer, the term of this patent is extended or adjusted under 35 U.S.C. 154(b) by 0 days.

(21) Appl. No.: 16/411,890

(22) Filed: May 14, 2019

(65) Prior Publication Data

US 2019/0357207 A1 Nov. 21, 2019

Related U.S. Application Data

(60) Provisional application No. 62/671,644, filed on May 15, 2018.

(51) Int. Cl.
*H04W 74/06* (2009.01)
*H04W 4/02* (2018.01)
(Continued)

(52) U.S. Cl.
CPC ....... *H04W 72/0426* (2013.01); *H04W 4/025* (2013.01); *H04W 16/14* (2013.01);
(Continued)

(58) Field of Classification Search
CPC ......... H04W 72/0426; H04W 72/1263; H04W 74/06; H04W 4/025; H04W 16/14;
(Continued)

(56) References Cited

U.S. PATENT DOCUMENTS

| 6,219,620 B1 | 4/2001 | Park et al. |
| 6,317,436 B1 | 11/2001 | Young et al. |

(Continued)

FOREIGN PATENT DOCUMENTS

| CN | 2657017 Y | 11/2004 |
| CN | 208092248 U | 11/2018 |

(Continued)

*Primary Examiner* — Mohamed A Kamara
(74) *Attorney, Agent, or Firm* — Oblon, McClelland, Maier & Neustadt, L.L.P.

(57) ABSTRACT

As monitoring systems for applications such as earthquake detection, oil and gas exploration, agriculture, and meteorological studies continue to advance in size and data quality, the task of data acquisition becomes equally challenging. Wireless systems for such monitoring applications are required to transfer data in a time-sensitive manner while conserving power in order to extend the operational life of the sensing/monitoring devices. Systems and methods for data acquisition for such scenarios are disclosed, with the objective of collision prevention and power conservation.

120 Claims, 5 Drawing Sheets

(51) Int. Cl.
*H04W 72/04* (2009.01)
*H04W 72/12* (2009.01)
*H04W 16/14* (2009.01)
*H04W 80/06* (2009.01)

(52) U.S. Cl.
CPC ... *H04W 72/0446* (2013.01); *H04W 72/1263* (2013.01); *H04W 74/06* (2013.01); *H04W 80/06* (2013.01)

(58) Field of Classification Search
CPC . H04W 80/06; H04W 72/0446; H04W 4/021; H04W 4/38; H04W 40/005; H04W 40/26; H04W 40/32
See application file for complete search history.

(56) References Cited

U.S. PATENT DOCUMENTS

| | | | |
|---|---|---|---|
| 6,829,227 | B1 | 12/2004 | Pitt et al. |
| 6,836,666 | B2 | 12/2004 | Gopalakrishnan et al. |
| 6,940,824 | B2 | 9/2005 | Shibutani |
| 7,224,642 | B1 | 5/2007 | Tran |
| 7,460,514 | B2 | 12/2008 | Ganz et al. |
| 7,573,782 | B2 | 8/2009 | Barakat |
| 7,613,071 | B2 | 11/2009 | Iseli et al. |
| 7,656,834 | B2 | 2/2010 | Lee et al. |
| 7,680,520 | B2 | 3/2010 | Ruuska et al. |
| 7,686,558 | B2 | 3/2010 | Tian et al. |
| 7,702,289 | B2 | 4/2010 | Tzavidas et al. |
| 7,720,468 | B1 | 5/2010 | Hong et al. |
| 7,773,457 | B2 | 8/2010 | Crice et al. |
| 7,860,043 | B2 | 12/2010 | Chen |
| 7,881,236 | B2 | 2/2011 | Park et al. |
| 7,894,301 | B2 | 2/2011 | Eperjesi et al. |
| 8,036,152 | B2 | 10/2011 | Brown et al. |
| 8,160,602 | B2 | 4/2012 | Wu et al. |
| 8,576,784 | B2 | 11/2013 | Lohr et al. |
| 8,605,546 | B2 | 12/2013 | Eperjesi et al. |
| 8,867,458 | B2 | 10/2014 | Koskela et al. |
| 8,976,763 | B2 | 3/2015 | Shrestha et al. |
| 9,084,144 | B2 | 6/2015 | Ramamurthy et al. |
| 9,247,499 | B2 | 1/2016 | Kwon et al. |
| 9,357,541 | B2 | 5/2016 | Moulsley et al. |
| 9,951,566 | B1 | 4/2018 | Bertagnolli et al. |
| 2002/0196840 | A1 | 12/2002 | Anderson et al. |
| 2004/0156387 | A1 | 8/2004 | Shapira |
| 2004/0257996 | A1 | 12/2004 | Choi et al. |
| 2005/0135317 | A1* | 6/2005 | Ware ............... H04W 72/005 370/338 |
| 2006/0133342 | A1 | 6/2006 | Zeng |
| 2006/0140147 | A1 | 6/2006 | Van Bemmel |
| 2006/0193279 | A1 | 8/2006 | Gu et al. |
| 2007/0091722 | A1 | 4/2007 | Karlsen |
| 2008/0080310 | A1 | 4/2008 | Eperjesi et al. |
| 2009/0202013 | A1 | 8/2009 | Sebastian |
| 2010/0208551 | A1 | 8/2010 | Golparian et al. |
| 2010/0226326 | A1 | 9/2010 | Ahn et al. |
| 2011/0019604 | A1 | 1/2011 | Chun et al. |
| 2012/0330769 | A1* | 12/2012 | Arceo ............ G06Q 20/4014 705/21 |
| 2013/0265853 | A1 | 10/2013 | Wager et al. |
| 2014/0301374 | A1 | 10/2014 | Malkawi et al. |
| 2015/0079907 | A1 | 3/2015 | Engelien-Lopes |
| 2015/0359000 | A1 | 12/2015 | Li et al. |
| 2016/0014803 | A1 | 1/2016 | Merlin et al. |
| 2016/0050040 | A1* | 2/2016 | Kosaka ........... H04W 28/0289 370/236 |
| 2016/0100361 | A1 | 4/2016 | Zheng et al. |
| 2016/0205606 | A1* | 7/2016 | Park ................. H04W 36/08 455/436 |
| 2016/0270118 | A1 | 9/2016 | He et al. |
| 2017/0208547 | A1* | 7/2017 | Choi ................ H04B 7/0452 |
| 2017/0311318 | A1 | 10/2017 | Li et al. |
| 2019/0044560 | A1* | 2/2019 | Koshy ............... H04B 17/21 |
| 2019/0045438 | A1* | 2/2019 | Cariou ........... H04W 52/0229 |
| 2019/0108738 | A1* | 4/2019 | Al Hajjaj ........... G08B 17/12 |
| 2019/0239192 | A1* | 8/2019 | Tang ............... H04B 7/0695 |

FOREIGN PATENT DOCUMENTS

| | | |
|---|---|---|
| EP | 1 599 063 A1 | 11/2005 |
| EP | 1 458 204 B1 | 12/2005 |
| EP | 1 615 395 A1 | 1/2006 |
| WO | WO 2005/067535 A2 | 7/2005 |

* cited by examiner

SYSTEMS AND METHODS FOR COLLISION PREVENTION AND POWER CONSERVATION IN WIRELESS NETWORKS

BACKGROUND OF THE INVENTION

Field of the Invention

1. Field of the Invention

The current disclosure relates to data communication systems operating over a shared medium network, and more specifically, collision prevention and power conservation in such data communication systems.

2. Applicable U.S. Patent Classification Definitions

The current disclosure deals with wireless local area networks [H04W84/12], scheduled wireless channel access [H04W74/04], wireless access through polling [H04W74/06], selection of wireless resources by users [H04W72/02], dynamic wireless traffic scheduling networks [H04W72/12], power management through the use of a predetermined schedule [H04W52/0216], switching off the wireless equipment [H04W52/0274].

Description of the Related Art

Although WLANs are effective and provide reliable connectivity in a common household or work environment, their use becomes limited when applied to a data-intensive and time-sensitive application over a large-scale area. Current protocols and communication schemes fail to achieve maximum performance under the burden of a high volume of data and high power requirement. As described in the IEEE 802.11 standard, the Distributed Coordination Function (DCF) as set to be the default channel access scheme. Channel access is obtained by contention, through the Carrier Sense Multiple Access with Collision Avoidance (CSMA/CA) scheme along with a binary exponential back-off. Given a large network, several devices would compete to relay information to a single WGN, causing the contention window to double in size rapidly, consequently resulting in large backoff delays. The Point Coordination Function (PCF) is a polling-based scheme offered by the IEEE 802.11af MAC, which comprises a Contention-Free Period (CFP), where stations gain access to the medium after receiving a CF-POLL frame from the Point Coordinator (PC), which is equivalent to an AP. However, the use of PCF gives rise to yet another constraint for large networks, the polling delay. The PC maintains a list of stations that are to be polled, called the polling list. The PC repeatedly polls stations that have already transmitted their data, thereby creating a delay for stations that are yet to send data and appear lower on the polling list. The Hybrid Coordination Function (HCF) introduced amendments for Quality-of-Service (QoS) enhancements, but is not of great interest in this study since the traffic generated from all the sensing/monitoring devices is assumed to be of equal priority. Hence, the channel access schemes provided by the standard are not well suited to the case when there is a dense network of stations spread across a large area, with time and power constraints.

Several schemes have been proposed to cater to effective data collection from such wireless systems. Contention-free access helps to reduce collisions and channel access delay in dense wireless networks. However, it comes at the cost of additional control signaling that may be required to coordinate communication among the STAs. In [US 2016/0270118 A1], a method for contention-free access using polling is described. However, STAs are only permitted a certain duration of time to transfer their data, which in turn can introduce delays for subsequent stations. The prior knowledge of a predetermined amount of data to be transmitted by the station is not used here. In [US 2017/0311318 A1], a trigger frame is generated by an AP that allows a STA to transmit uplink data using a specified access category. However, this is not of great significance in our scenario since all the stations are of equal priority, and will use the same access category for transmission. In [US 2004/0257996 A1], a polling list is created and STAs are polled as per the Point Coordination Function (PCF), and limits overall data transfer as per the amount of data received. In [US 2015/0359000 A1], a status report is requested by the AP from a group of STAs, and uplink data transfer is scheduled by the AP as per the received status reports. However, this approach creates severe contention among the stations for transmitting uplink reports which in turn hinders the data collection process. In [U.S. Pat. No. 6,829,227 B1], a polling signal is transmitted by the AP requesting a STA to transfer a predetermined amount of data. Subsequent data is only received at the AP only after further polling signals are transmitted. Separate polling signals are transmitted over different sub-channels, implying a need for more amount of spectrum/channels. The requirement for repeated polling creates a delay which hinders the data collection process. In [U.S. Pat. No. 7,860,043 B2], an approach for power conservation using the network allocation vector is described. However, the use of this approach is broad and does not specify which particular frames are used as a part of the power conservation process. In [US 2006/0140147 A1], STAs are required to stay silent for a specified duration of time after transmitting data. While this may help to counter collisions and ensure effective bandwidth allocation, certain STAs may be required to stay silent for longer durations as compared to other STAs. This in turn creates a delay which hinders the data collection process. Moreover, the STAs are not operated in low-power mode by switching off the transceiver, leading to a wastage of power resources. In [U.S. Pat. No. 9,247,499 B2], STAs are issued a configuration for power conservation by operating in a power-down mode by the access point. The duration of power-down is determined by precise points of time when the access point will be transferring data to the station. However, the access point does not take into account the STAs' requirements for operating in power-down mode, as further data transfer may be required to take place. In [U.S. Pat. No. 7,702,289 B2], a scheduler is composed using the processing capability information of the STAs. The scheduler is subsequently used to allocate uplink resources to the STAs. However, informing the scheduler of the processing capabilities creates a delay that can hinder the data collection process. Moreover, the prior knowledge of a predetermined amount of data to be transmitted by the station is not used here. In [U.S. Pat. No. 7,881,236 B2], an uplink grant signal is transmitted by a base station towards a STA. Data in the STA's buffer is transferred to the AP, else new data is transferred by the STA. However, this approach requires additional processing by STAs to determine whether there is data available on the buffer, and to transfer new data in the case that there is no data on the buffer. Moreover, additional grant signals may be required for a station to transmit all of its data, which can hinder the data collection process. In [US 2016/0014803 A1], STAs are requested to provide buffer information or transmission time to the AP. While this approach will aid the AP is allocating resources to STAs, severe contention occurs in the presence of a large number of STAs, which in turn creates a delay that can hinder the data collection process. Moreover, multiple exchanges of buffer information or transmission time may be required to transmit all of the data in the buffer, which in turn adds to the overhead. In [U.S. Pat. No. 9,131,509 B2], the propagation delay between STAs is exploited by the AP to simultaneously poll several STAs. However, this approach may be hindered by spontaneous changes in channel quality and collisions are bound to occur among stations having similar propagation delay. In [U.S. Pat. No. 7,912,032 B2], STAs are classified by priority and are polled in a manner determined by their priority level. In the case where all STAs hold equal priority, this approach reduces to a standard wireless channel access scheme. Additional overhead is introduced by requiring the STA to first send a confirmation message that it has information to transmit, rather than transmitting the information right away. In [U.S. Pat. No. 7,460,514 B2], an adaptive polling scheme is described wherein the polling rate is modified as per the data transfer being performed by STAs. However, this approach may require a large number of polling messages in the presence of a large number of STAs, which in turn creates a delay that can hinder the data collection process. In [U.S. Pat. No. 9,357,541B2], a control signal is transmitted by an AP, wherein a certain number of bits of intended for one STA, while a certain number of other bits are intended for another STA. This approach however, may not be effective for a large number of STAs. In [US 2006/0193279 A1], a STA is polled by the AP in an acknowledgment message after data is received from a previous STA. However, this approach may require a large number of polling messages in the presence of a large number of STAs, which in turn creates a delay that can hinder the data collection process. In [US 2015/0079907 A1], a STA is continuously polled by an AP until a certain duration has passed or uplink data is available for transfer. In [U.S. Pat. No. 8,576,784 B2], STAs are required to repeatedly transmit reference signals that are used for uplink channel quality assessment, which creates a delay that can hinder the data collection process. Moreover, the transmission of resource requests by a large number of stations will result in severe contention and collisions. In [U.S. Pat. No. 6,836,666 B2], STAs are required to report their current data, capability, and power information to the AP, using which the STAs are allowed to transfer data at a specified rate. Furthermore, this rate can be altered by an additional control message from the AP. This approach employs excessive control signaling and a large number of reverse link requests which creates a delay that can hinder the data collection process. In [US 2016/0100361 A1], data frames hold information regarding the buffer information or transmission time. This approach is similar to what is implemented in [US 2016/0014803 A1]. In [U.S. Pat. No. 7,680,520 B2], power conservation parameters are transferred to a device that is polled, such that the polled device is limited to a certain number of message transmissions in order to reduce power consumption. However, a device would then be placed into low-power mode before all its data has been transmitted. In [WO 2005/067535 A2], a device suspends the communication link for a certain duration as specified in a frame that is received by the device. Communication is resumed at the end of the suspended duration. However, control signals are repetitively exchanged between the devices which in turn creates a delay that can hinder the data collection process. In [EP 1599063 A1], uplink data resources are estimated and allocated to a user by the base station based on the scheduling information. This approach may not provide an accurate amount of resources to a user to transfer all its resources. Furthermore, this would not be effective in a sensor-based wireless network. Palacios et al. and Omori et al. described the use of the network allocation vector at a STA for power conservation. Azcorra, et al. proposed the use of micro-naps for power conservation using the backoff counter and network allocation vector parameters.

In [U.S. Pat. No. 8,036,152 B2], a method for setting a STA in sleep mode as per the time slot assignment is described. However, the STAs are required to scan for beacon signals on more than one channel. In [U.S. Pat. No. 6,317,436 B1], an adaptive broadcast cycle is used to search for empty slots, which in turn is used to shorten the overall frame length. However, this approach requires the use of broadcast schedules at each of the STAs. In [US 2009/0202013 A1], the uplink transmission rate is altered by allocating additional time slots to some STAs, while deallocating time slots from the other STAs. However, the overall frame length may remain the same in this scenario. In [U.S. Pat. No. 8,160,602 B2], channel quality reports are requested from the STAs which are then used to determine the time slot assignment. However, this results in severe contention in the presence of a large number of STAs, which in turn creates a delay that can hinder the data collection process. In [U.S. Pat. No. 8,976,763 B2], data transfer from a STA is triggered when the amount of buffered data exceeds a certain threshold. While this approach works well for providing guaranteed time slots, the prior knowledge of a predetermined amount of data to be transmitted by the station is not used here. In [U.S. Pat. No. 6,940,824 B2], time slots are assigned to STAs based on the channel conditions. In [US 2004/0156387 A1], time slots are assigned to STAs based on cumulative scores that are calculated using the required rate factors, which are in turn dependent on the signal-to-noise ratio. In [EP 1458204 B1], a greater number of time slots are allocated to a communication terminal apparatus by a base station, having a greater ratio of an amount of transmitted data to the total amount of data to be transmitted. In [EP 1615395 A1], channel access is requested by the STAs, which is then granted to the STAs through a broadcast message from the AP. However, this results in severe contention in the presence of a large number of STAs, which in turn creates a delay that can hinder the data collection process.

In [U.S. Pat. No. 7,224,642 B1], a wireless mesh network is employed in seismic data acquisition, to transfer data among the geophones, each having localization capability. In [U.S. Pat. No. 7,773,457 B2], a similar node-to-node communication network is formed among the geophones, across multiple channels. In both cases, the performance would not scale with an increase in the number of seismic channels per geophones, i.e. the data generation rate. In [U.S. Pat. No. 7,613,071 B2], the use of steerable antennas is made to exploit spatial diversity. In [US 2007/0091722 A1], a similar wireless architecture for seismic data acquisition using directional antennas is described. In [U.S. Pat. No. 6,219,620 B1], a cell access node is used to collect data from the nearby geophones over a common frequency, which is then relayed by cable, or radio to a final data collection center. In [U.S. Pat. No. 7,573,782 B2], similar cells of geophones are formed, with independent pathways being formed among the cells for relaying data to the data collection center. In [U.S. Pat. No. 7,894,301 B2], data is collected from the geophones by dividing the data acquisition period into a plurality of time slots, with all time slots having a fixed time length. In [US 2010/0208551 A1], a method for assigning geophones to various base stations for data transfer is described. In [US 2013/0265853 A1], data is transferred serially along a chain of geophones. In [US 2008/0080310 A1], a plurality of geophones are deployed that wirelessly transmit data to a repeater unit or to the final data collection center, when certain conditions regarding the seismic data acquisition process are met. In [U.S. Pat. No. 8,605,546 B2], a wireless architecture for data transfer from geophones to a repeater unit is described, such that the data is relayed from the repeater units to a remote unit under specific conditions. In [CN 208092248 U], UAVs are used for acquiring data from the geophones. In [CN 2657017 Y], a spread spectrum communication technique is used for acquiring data from the geophones. Snow et al. have described experimental results for a low-power TDMA protocol over IEEE 802.11. A schedule is periodically broadcasted to all stations, and the access point has the option to dynamically modify the length of each client's time slot. Although some high-level time slot modification schemes are described, the exact nature and impact of these modifications is not described. The focus is primarily on the experimental parameters for enabling TDMA over IEEE 802.11, rather than on time slot optimization.

SUMMARY OF THE INVENTION

The use of wireless local area networks (WLANs) has become prevalent in modern society. A WLAN typically comprises an access point (AP) which coordinates communication procedures with users or stations (STAs) that are within its range. WLANs can be used to acquire data in large-scale monitoring applications. Some such instances include oil and gas exploration, earthquake detection, agriculture and weather monitoring, and other similar data-intensive applications.

A large-scale data-intensive wireless network presents various challenges, wherein a large area on the order of several square kilometers, is mapped by a dense network of devices (sensors or monitoring units with wireless communication capability) each having constraints on power consumption and storage capabilities. While cellular networks can provide coverage over large areas, they suffer from poor coverage in rural or remote areas in addition to substantial power consumption demands. Some requirements from the wireless communications perspective are summarized below:

High Throughput: In oil and gas exploration applications, a minimum sampling time of 0.5 ms for a device with a 24-bit Analog-to-Digital Converter (ADC) would impose a data generation rate of 48 kbps. Three-component (3-C) geophones (devices used for recording seismic data) would generate thrice the amount of data, at a rate of 144 kbps. Although the rate per device may not seem significant, the aggregate data rate for say, 30,000 geophones, can be several Gigabits per second. Hence, the wireless scheme must support high data acquisition rates for rapid collection of data.

Low Power Consumption: Longer monitoring applications require that the sensing devices last for longer intervals of time, even up to one month. A wireless system would introduce further power consumption demands, through the use of a transceiver. Hence, energy-efficient schemes are required to extend the operational life of the devices.

Protection of Data: Confidentiality of the data that is collected by the devices is of prime importance. Communication between all the wireless components must be securely encrypted, to prevent a breach of data.

Geolocation: Some large-scale monitoring applications such as in the case of oil and gas exploration, require location information of the sensing devices for generating subsurface images of sufficient quality. In GPS-deprived environments, inaccurate location information of the devices will lead to significant degradation of image quality. A wireless scheme with localization capabilities is ideal for obtaining geographic coordinates (with respect to a fixed point of reference) of the devices.

The topic of wireless seismic data acquisition is considered here. The topology of the wireless network is typically decided and deployed prior to the data acquisition phase. A typical procedure for seismic data acquisition is shown in FIG. 1. An orthogonal geometry involves the deployment of geophones along Receiver Lines (RLs) which are separated by a distance known as the Receiver Line Interval (RLI). In seismic data acquisition, a seismic source, such as dynamite or vibroseis trucks, generate seismic waves along source lines (SLs), which are separated by the Source Line Interval (SLI). A Wireless Gateway Node (WGN) can be used to collect data from devices that are within its range, as shown in FIG. 2. The architecture presents a star-topology, implying that the devices need not spend additional energy on relaying information through a multi-hop network. The burden of storing large amounts of data and high power consumption can be carried by the WGNs, consequently improving the devices' performance. The information from the WGNs is then relayed to the Data Collection Center (DCC) via DCC Relays, as shown in FIG. 3. The WGN is essentially equivalent to an access point, with the geophones as its associated stations.

To improve the spectral efficiency and the overall system capacity, wireless coverage can be provided using frequency reuse, by dividing the area into tessellating hexagonal cells, as shown in FIG. 4. Each cell is serviced by a dedicated WGN. The depicted topology specifies an inter-device distance of 25 m along the RL, and an RLI of 200 m. A collection of 30 RLs, each comprising 480 devices, amounts to a total of 14,400 devices that can map an area of approximately 72 square kilometers. Hence, timely data acquisition from a dense network of geophones over a very large area is to be tackled with.

The present disclosure describes systems and methods for collecting information from data-intensive large-scale wireless networks. In large-scale monitoring applications such as oil and gas exploration, often the amount of information that is to be collected from each of the sensing/monitoring devices is known beforehand. This fact can be exploited to design channel access methods that can prevent collisions and promote power conservation.

A first method is disclosed wherein each station (STA) is offered a dedicated data transfer link with the access point (AP), such as using the transmission control protocol (TCP). The amount of data that can be exchanged is not bounded, and is known to be of some predetermined value. In this case, it would amount to 144 kbps times the recording or listen interval of 6 s, resulting in 864 Kb of data per geophone. A schedule is drawn from a uniform distribution that determines the order in which STAs are polled by the AP. A polling packet is sent by the AP to the first STA on the schedule, instructing it to begin the transfer of its data. While the first STA is in operation with the AP, other STAs wait to be polled by the AP for their turn to transfer data. The next STA is only polled after the previous STA has completed transfer of the predetermined amount of data with the AP. This ensures contention-free access along with reduced delays, since a single polling packet is sufficient to trigger data transfer from the STA. After a STA has completed transfer of the predetermined amount of data, it can enter a low-power state for a duration of time specified by the AP. However, the STA can inform the AP of an alternate duration of time for entering a low-power state, as deemed by the STA based on the status of its operation. This process is repeated in sequence for the remaining STAs.

A second method is disclosed wherein a schedule, containing reserved time slots for each of the STAs, is broadcasted by the AP to all the STAs. Using this information, the STAs can enter a low-power state for the duration outside the allocated time slot, and transfer data to the AP during the allocated time slot. A novel feature of the proposed method is that the time slots for the succeeding frame can be adaptively modified based on the performance perceived in the current frame. The time slot for a STA in the subsequent frame can be increased or decreased in value based on how much data was received in the current frame. The time slot value for a STA in the subsequent frame is computed as the product of the time slot length used in the current frame and the ratio of the remaining amount of data to be transferred (which is known, since a predetermined amount of data is to be acquired from each of the geophones) to the amount of data that was transferred in the current frame.

Additional features and advantages of the disclosed invention are elucidated in the following detailed description of the invention and the embodiments thereof, from the claims and from the accompanying drawings.

DETAILED DESCRIPTION OF THE INVENTION

Figure 1:
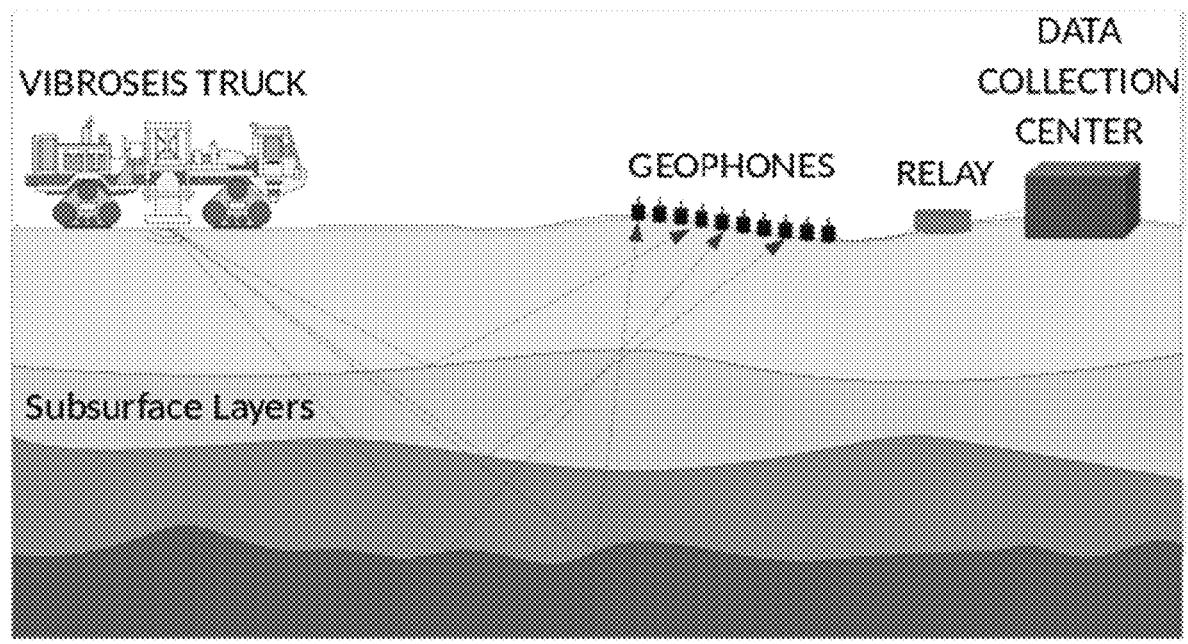
FIG. 1 provides an illustration of the seismic data acquisition process. A vibroseis truck generates seismic waves that are reflected by subsurface layers and recorded by geophones. The recorded data is collected from the geophones and amalgamated at the data collection center.
Figure 2:
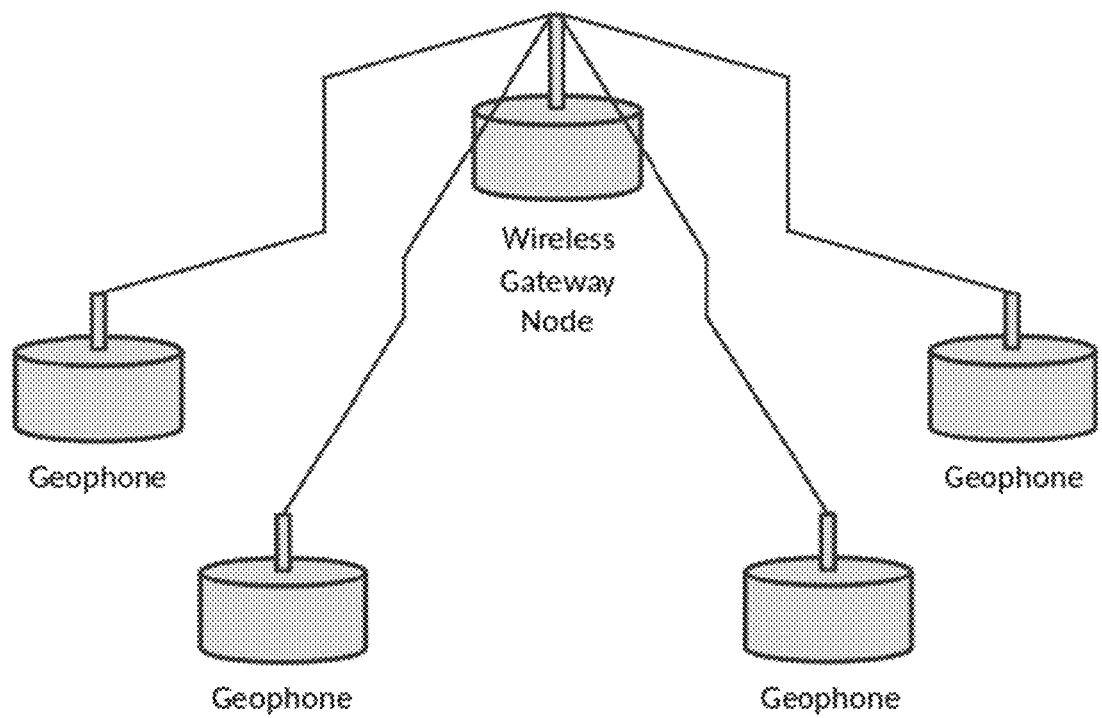
FIG. 2 provides an illustration of a wireless architecture that can be used for data collection by a WGN from the surrounding/associated geophones.
Figure 3:
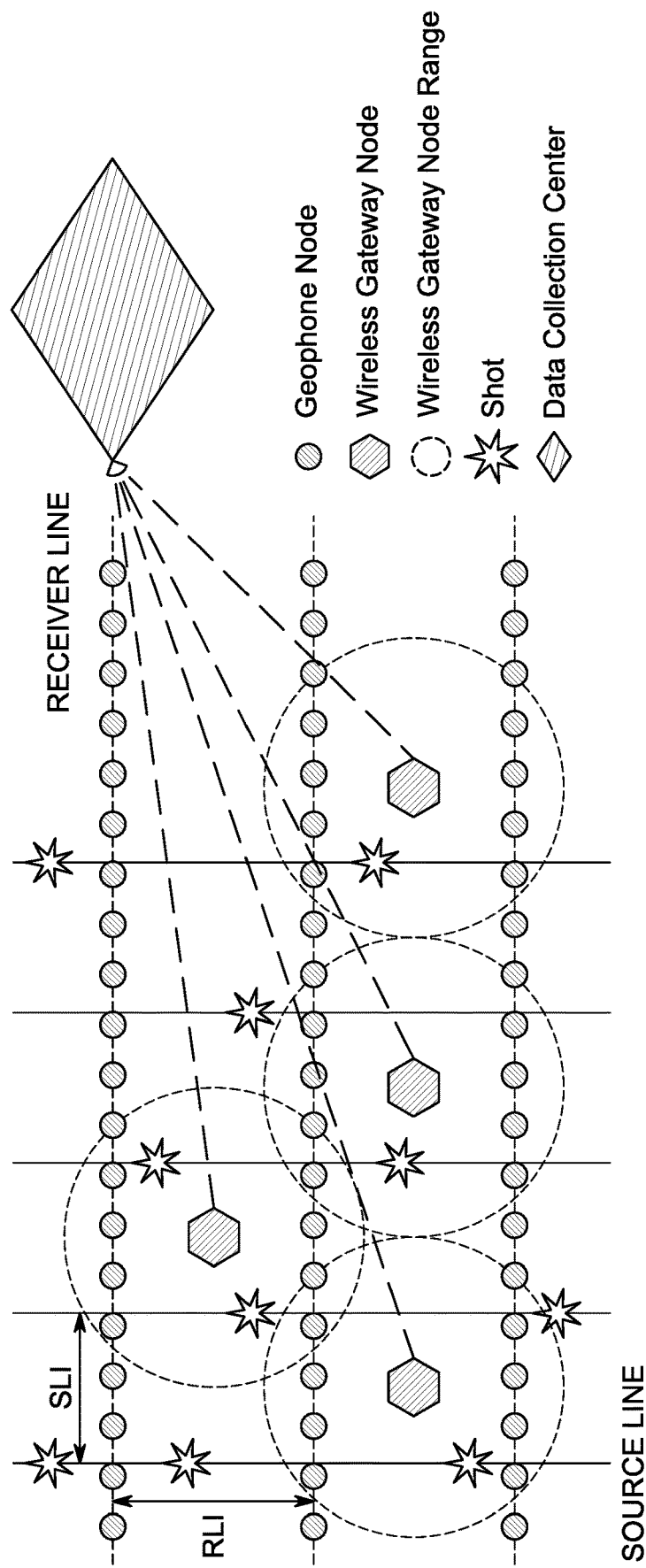
FIG. 3 provides an illustration of a wireless architecture for data transfer between geophones and the Data Collection Center while seismic waves (shots) are generated by vibroseis trucks along the Source Line.
Figure 4:
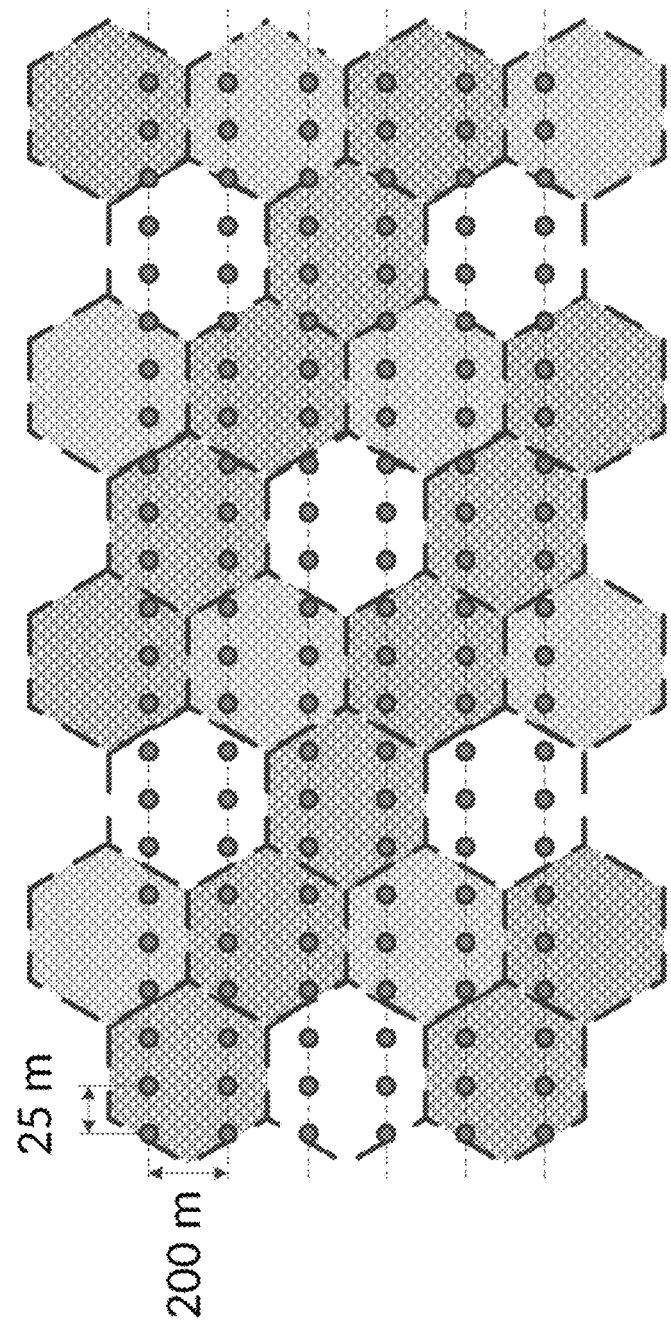
FIG. 4 provides an illustration of the use of hexagonal clustering for frequency reuse for an orthogonal topology of geophones.

While the disclosed invention can be interpreted and implemented in many different forms, specific scenarios and implementations are described in the drawings, with the understanding that the present disclosure is to be considered to be an exemplification of the principles of the invention and is not intended to limit the invention to the specific scenarios or implementations that are illustrated.

In monitoring applications such as oil and gas exploration, a known amount of data has to be collected from each of the sensing devices, with all devices having equal priority for data collection. This fact can be exploited to prevent collisions and conserve power through the use of specialized channel access schemes. Energy efficiency is also of prime importance so as to ensure long operational periods for the devices. The proposed method offers contention-free access while reducing the amount of power consumed. A significant amount of power is wasted owing to idle listening (a device listens to the channel when there are no packets being sent) and packet overhearing (a device receives data packets that are destined to the WGN or another device). The proposed methods operate the sensing/monitoring devices into low-power mode, wherein the transceiver is switched off, to avoid power consumption owing to the above two factors. Furthermore, power consumption is reduced as a result of lowering the number of collisions during channel access.

Earthquake monitoring and seismic surveying are critical applications that require all the data to be delivered reliably without any loss of information. The transmission control protocol (TCP) mechanism is ideal for this purpose, as it ensures that packets are retransmitted in the event that they are not delivered to the recipient. However, the use of TCP in large infrastructure WLANs, such as in the presence of a large number of geophones in the case of seismic data acquisition, can exacerbate the problem of TCP unfairness. The proposed methods eliminate this problem by having only a single TCP link operating at any point of time during the data acquisition process. This also prevents collisions among the sensing/monitoring devices from occurring.

Figure 5:
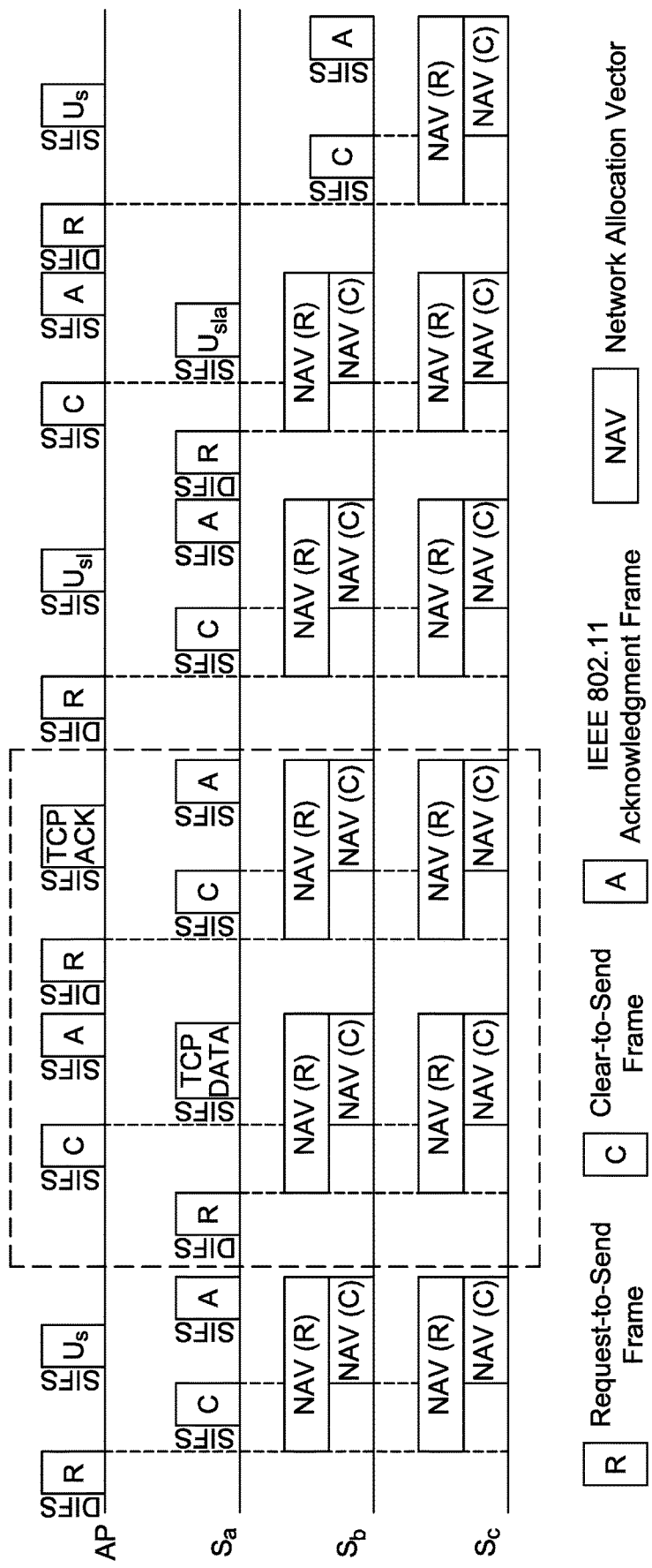
FIG. 5 is a timing diagram illustrating the operation of the communication system of FIG. 2, wherein the WGN is the AP and the sensing/monitoring devices are STAs. The proposed method for collision prevention and power conservation is implemented through the use of control or polling messages.

A first method for collision prevention and power conservation is described. The AP creates a schedule, which can be drawn from a uniform distribution, which determines the order in which the individual STAs are polled for data transmission. The control or polling messages are typically small-sized packets or frames that would not significantly contribute to the overall delay. Moreover, these messages can be transmitted via the user datagram protocol (UDP) mechanism which does not introduce much overhead. In FIG. 5, the data collection process begins with the transmission of a polling message, $U_s$ from the AP towards the first STA on the schedule, $S_a$. Upon receiving $U_s$, $S_a$ begins data transmission using the TCP mechanism. The transmission of polling messages $U_s$ is stopped by the AP after the reception of the first data packet from $S_a$. There is no prescribed limit on the time or data resources that are allocated to $S_a$; data transfer is done for as long as required, until a predetermined/required amount of data is received at the AP. When a TCP acknowledgement message corresponding to its final TCP payload segment is received by $S_a$, the TCP connection is terminated by $S_a$. The AP now transmits a polling message $U_s$ to $S_b$, the next STA on the schedule. A similar procedure is repeated wherein all data is transferred from $S_b$ and the next STA on the schedule is polled when data transfer with $S_b$ has been completed. The above procedure is repeated until data transfer is completed with all the STAs in the network. By adding capability for additional control messages, power conservation can be incorporated into the above method. After data transfer is completed between $S_a$ and the AP, a control message $U_{s1}$ is transmitted by the AP towards $S_a$ instructing it to enter a low-power state by switching off its transceiver for a specified duration of time. In seismic data acquisition, this duration of time is typically known, and be calculated as the duration of time until the start of the next sweep/shot. However, in the event that $S_a$ would like to alter the specified duration as per its own needs and operating status, a control message $U_{s1a}$ is transmitted by $S_a$ to notify the AP about a change in the specified duration. Alternatively, $S_a$ would agree to the instruction sent by the AP via the control message $U_{s1}$. The STA $S_a$ accordingly switches off its transceiver for the final decided duration. Upon reception of the control message $U_{s1a}$ at the AP, the polling message $U_s$ is transmitted by the AP towards the next STA $S_b$ on the schedule. The above procedure is repeated until data transfer is completed with all the STAs in the network. Further power can be conserved by making use of the network allocation vector (NAV) status in WLAN systems. NAV helps implement virtual carrier sensing i.e. a STA that can hear transmission between other STAs would back off from the medium to prevent collisions. Hence, for the duration of the NAV, this STA would not have to transmit/receive any frames, and can be operated in a low-power state. For instance, during the period of data transfer between $S_a$ and the AP, all the other STAs apart from $S_a$, that can hear the exchange of frames between the WGN and $S_a$ update their NAV counter according to the duration values contained in the headers of the RTS (request to send) and CTS (clear to send) frames. The value of the NAV counter can be used to determine the duration of sleep, as seen in FIG. 5. A typical duration of 250 μs is required to switch from sleep (low-power) to idle mode of operation. A STA can be timed to wake up before the expiration of the NAV counter.

A second method for collision prevention and power conservation is described. Through the use of time division multiple access (TDMA), contention between STAs can be significantly reduced. This would also enable the operation of a single TCP connection during a designated time slot, thereby circumventing the problem of TCP unfairness. The schedule containing the time slots for all STAs is broadcasted by the AP, allowing for effective power saving. A STA can enter low-power mode for the entire duration of the frame apart from its allocated time slot. A STA can also enter low-power mode before the end of its allocated time slot, if data transfer is completed prematurely. It may also enter low power mode immediately after receiving the schedule from the AP. STAs at the cell-edge not only operate at higher path losses, but are also susceptible to co-channel interference. Meanwhile, STAs that are located near the AP can transfer data more reliably. To ensure that all geophones are allocated sufficient time resources, the time slot assignment or schedule can be accordingly altered at the completion of every frame. New time slot lengths are obtained by scaling the time slot length in the prior frame by the ratio of the amount of pending data to the data transmitted in the prior frame. The time slot length is capped at a maximum value to prevent over-allocation of time resources. Devices that have completed data transfer are not allocated a time slot. The proposed method can rely on the use of UDP packets to disseminate schedule information, since they introduce minimal overhead. The UDP packets are broadcasted by the AP, and contain information about the length of the time slot reserved for the transmission of the schedule itself, in addition to the length of the time slots allocated to each of the STAs. For the first frame, all STAs can be allocated time slots of the same length, which is set to the maximum allowed value, The AP then broadcasts UDP packets containing schedule information. The STAs listen to the channel for UDP broadcast packets. A STA can enter low-power mode after securing the requisite schedule information. Each STA then would return to the idle state of operation for data transmission using TCP, as per its allocated time slot. It remains in low-power mode for the remaining duration of the frame. At the end of the frame, new time slot lengths are computed by the AP. The time slot length for a new frame is scaled up or down as per the amount of data received in the previous frame.

$$t_{new} = t_{previous} * (\text{Total amount of data yet to be delivered to the AP/Total amount of data delivered in the previous frame})$$

Figure 6:
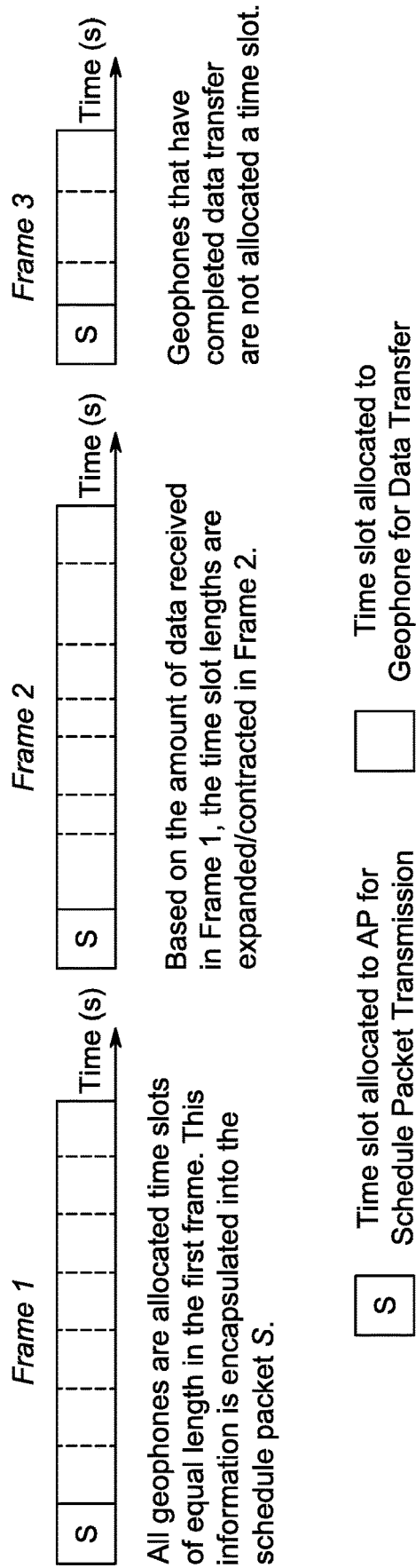
FIG. 6 is a timing diagram illustrating the operation of the communication system of FIG. 2, wherein the WGN is the AP and the sensing/monitoring devices are STAs. The proposed method for collision prevention and power conservation is implemented through the use of a broadcasted schedule containing the time slots for the STAs, which are adaptively modified every frame.

Hence, STAs that were not able to deliver much data to the AP are allocated a new time slot of greater length. Similarly, STAs that have delivered most of their data to the AP and have relatively lesser amount of pending data to be transmitted, are allocated a smaller time slot. This has been illustrated in FIG. 6. This helps minimize the degree to which the time slot allocation is under or overestimated, thereby improving the overall performance of data acquisition. The newly computed time slot lengths are encapsulated into a UDP packet and broadcasted by the AP. This process is repeated until data from all the STAs is received by the AP. A time slot must be long enough for the transfer of a TCP segment and its associated acknowledgement. A guard time can also be allocated to prevent overlapping of transmissions between adjacent time slots.

The proposed methods can be implemented at the higher transport and application layers without requiring amendments to existing wireless standards, and hence remain standards-compliant. In the case that TDMA functionality is to be implemented by the upper layers, synchronization is required between the applications that are operating on the various sensing/monitoring devices. Software timestamping for application synchronization can be achieved with the Timing Synchronization Function (TSF) timer. The TSF timer can be accessed by higher layers using the GETTSFTIME.request and GETTSFTIME.confirm primitives, as described in the IEEE 802.11 standard. Standards-compliant methods eliminate the monetary and time resources that are required to standardize and manufacture new types of equipment, along with the reduction of the costs incurred by the end consumer. Seismic surveys, earthquake detection, and other agriculture or meteorological-related monitoring applications can be conducted effectively by purchasing off-the-shelf hardware and operating with the proposed methods.

It is therefore intended that the foregoing detailed description be regarded as illustrative rather than limiting, and that it be understood that it is the following claims, including all equivalents, that are intended to define the spirit and scope of this invention.

What is claimed is:

1. A method for collision prevention in a wireless network comprising an access point and a plurality of stations, the method comprising the steps of:
   (a) creation of a schedule at the said access point, that determines the order in which subsets comprised of one or more of the said plurality of stations are polled for transmission of one or more information messages by the said access point;
   (b) transmission of a control message by the said access point intended for reception at the stations belonging to the first subset on the said schedule, indicating an interest of the said access point in receiving one or more information messages from each of the stations belonging to the first subset;

(c) initiation of information transfer by each station belonging to the first subset with the said access point, in response to the reception of the control message at the respective station;

(d) transmission of one or more information messages by each station belonging to the first subset to the said access point;

(e) termination of information transfer by each station belonging to the first subset upon the delivery of a predetermined number of bits or bytes of information to the said access point;

(f) repetition of steps (b) through (e) with the first subset of stations being replaced by the subsequent subset of stations on the schedule.

2. The method of claim 1, wherein the wireless network supports an Institute of Electrical and Electronics Engineers (IEEE) 802.11 communication protocol.

3. The method of claim 1, wherein the wireless network supports an IEEE 802.15 communication protocol.

4. The method of claim 1, wherein the wireless network supports an IEEE 802.16 communication protocol.

5. The method of claim 1, wherein the wireless network supports an IEEE 802.22 communication protocol.

6. The method of claim 1, wherein the wireless network supports a Long Term Evolution in Unlicensed Spectrum (LTE-U) communication protocol.

7. The method of claim 1, wherein the wireless network is a wireless sensor network.

8. The method of claim 1, wherein a subset of the said plurality of stations is comprised of a single station.

9. The method of claim 1, wherein the said access point is a station belonging to another wireless network, comprising an access point and a plurality of other stations.

10. The method of claim 1, wherein the transmission of messages is performed either using the User Datagram Protocol (UDP) or Transmission Control Protocol (TCP) mechanism.

11. The method of claim 1, wherein step (d) further comprises the step of:
(d1) storing as a part of the information message, the geographic coordinates of the first station.

12. The method of claim 1, wherein step (d) further comprises the step of:
(d1) storing as a part of the information message, the instance of time at which the information messages were generated by the first station.

13. The method of claim 1, wherein step (c) further comprises the step of:
(c1) initiation of information transfer by the said access point with each station belonging to the first subset, upon delivery of the control message to the respective station.

14. The method of claim 13, wherein step (d) further comprises the step of:
(d1) transmission of one or more information messages by the said access point to each station belonging to the first subset.

15. The method of claim 14, wherein step (e) further comprises the step of:
(e1) termination of information transfer by the said access point upon the delivery of a predetermined number of bits or bytes of information to each station belonging to the first subset.

16. An apparatus for collision prevention in a wireless network comprising an access point and a plurality of stations, the apparatus comprising:
one or more memory units that store computer program code;
a transceiver; and
one or more processors that can communicate with one or more of the memory units and the transceiver, one or more of the processors and the computer program code being configured to execute the commands to:
(a) create a schedule at the said access point, that determines the order in which subsets comprised of one or more of the said plurality of stations are polled for transmission of one or more information messages by the said access point;
(b) transmit a control message from the said access point intended for reception at the stations belonging to the first subset on the said schedule, indicating an interest of the said access point in receiving one or more information messages from each of the stations belonging to the first subset;
(c) initiate information transfer from each station belonging to the first subset with the said access point, in response to the reception of the control message at the respective station;
(d) transmit one or more information messages from each station belonging to the first subset to the said access point;
(e) terminate information transfer from each station belonging to the first subset upon the delivery of a predetermined number of bits or bytes of information to the said access point;
(f) repeat steps (b) through (e) with the first subset of stations being replaced by the subsequent subset of stations on the schedule.

17. The apparatus of claim 16, wherein one or more of the processors and the computer program code are further configured to operate in a wireless network supporting an Institute of Electrical and Electronics Engineers (IEEE) 802.11 communication protocol.

18. The apparatus of claim 16, wherein one or more of the processors and the computer program code are further configured to operate in a wireless network supporting an IEEE 802.15 communication protocol.

19. The apparatus of claim 16, wherein one or more of the processors and the computer program code are further configured to operate in a wireless network supporting an IEEE 802.16 communication protocol.

20. The apparatus of claim 16, wherein one or more of the processors and the computer program code are further configured to operate in a wireless network supporting an IEEE 802.22 communication protocol.

21. The apparatus of claim 16, wherein one or more of the processors and the computer program code are further configured to operate in a wireless network supporting a Long Term Evolution in Unlicensed Spectrum (LTE-U) communication protocol.

22. The apparatus of claim 16, wherein one or more of the processors and the computer program code are further configured to operate in a wireless network that is a wireless sensor network.

23. The apparatus of claim 16, wherein one or more of the processors and the computer program code are further configured to operate with a subset of the said plurality of stations that is comprised of a single station.

24. The apparatus of claim 16, wherein one or more of the processors and the computer program code are further configured to operate in a wireless network comprising an access point that is a station belonging to another wireless network, comprising an access point and a plurality of other stations.

25. The apparatus of claim 16, wherein one or more of the processors and the computer program code are further configured to perform the transmission of messages either using the User Datagram Protocol (UDP) or Transmission Control Protocol (TCP) mechanism.

26. The apparatus of claim 16, wherein one or more of the processors and the computer program code are further configured to execute command (d) to:
(d1) store as a part of the information message, the geographic coordinates of the first station.

27. The apparatus of claim 16, wherein one or more of the processors and the computer program code are further configured to execute command (d) to:
(d1) store as a part of the information message, the instance of time at which the information messages were generated by the first station.

28. The apparatus of claim 16, wherein one or more of the processors and the computer program code are further configured to execute command (c) to:
(c1) initiate information transfer from the said access point to each station belonging to the first subset, upon delivery of the control message to the respective station.

29. The apparatus of claim 28, wherein one or more of the processors and the computer program code are further configured to execute command (d) to:
(d1) transmit one or more information messages from the said access point to each station belonging to the first subset.

30. The apparatus of claim 29, wherein one or more of the processors and the computer program code are further configured to execute command (e) to:
(e1) terminate information transfer from the said access point upon the delivery of a predetermined number of bits or bytes of information to each station belonging to the first subset.

31. A method for power conservation in a wireless network comprising an access point and a plurality of stations, the method comprising the steps of:
(a) creation of a schedule at the said access point, that determines the order in which the said stations are polled for transmission of one or more information messages by the said access point;
(b) transmission of a control message A by the said access point intended for reception at the first station on the said schedule, indicating an interest of the said access point in receiving one or more information messages from the first station;
(c) transmission of one or more information messages by the first station, in response to the reception of the control message A at the first station;
(d) transmission of a control message B by the said access point in response to the reception of a predetermined number of bits or bytes of information, instructing the first station to power off its transceiver for a duration of time unique to the first station;
(e) transmission of a control message C by the first station in response to the reception of the control message B, either acknowledging the instruction issued by the said access point, or indicating to the said access point about an updated duration of time for which the transceiver of the first station will be powered off;
(f) shutdown of the transceiver of the first station, for a duration as specified by either the control message B or the control message C;
(g) repetition of steps (b) through (f), in response to the reception of the control message C at the said access point, with the first station being replaced by the subsequent station on the said schedule.

32. The method of claim 31, wherein the wireless network supports an Institute of Electrical and Electronics Engineers (IEEE) 802.11 communication protocol.

33. The method of claim 31, wherein the wireless network supports an IEEE 802.15 communication protocol.

34. The method of claim 31, wherein the wireless network supports an IEEE 802.16 communication protocol.

35. The method of claim 31, wherein the wireless network supports an IEEE 802.22 communication protocol.

36. The method of claim 31, wherein the wireless network supports a Long Term Evolution in Unlicensed Spectrum (LTE-U) communication protocol.

37. The method of claim 31, wherein the wireless network is a wireless sensor network.

38. The method of claim 31, wherein the said access point is a station belonging to another wireless network, comprising an access point and a plurality of other stations.

39. The method of claim 31, wherein the transmission of messages is performed either using the (User Datagram Protocol) UDP or (Transmission Control Protocol) TCP mechanism.

40. The method of claim 31, wherein step (c) further comprises the step of:
(c1) storing as a part of the information message, the geographic coordinates of the first station.

41. The method of claim 31, wherein step (c) further comprises the step of:
(c1) storing as a part of the information message, the instance of time at which the information messages were generated by the first station.

42. The method of claim 31, wherein step (c) further comprises the step of:
(c1) storing as a part of the information message, the total size of subsequent information messages that will be transmitted by the first station.

43. The method of claim 31, wherein step (c) further comprises the step of:
(c1) storing as a part of the information message, a flag message, indicating to the recipient that there shall be no further transmission of information messages from the first station.

44. The method of claim 31, wherein step (c) further comprises the step of:
(c1) transmission of one or more information messages from the said access point to the first station, upon delivery of the control message A to the respective station.

45. The method of claim 44, wherein step (d) further comprises the step of:
(d1) transmission of a control message B from the said access point in response to the reception of a predetermined number of bits or bytes of information at the first station, instructing the first station to power off its transceiver for a duration of time unique to the first station.

46. The method of claim 44, wherein step (c1) further comprises the step of:
(c2) storing as a part of the information message, the total size of subsequent information messages that will be transmitted by the said access point.

47. The method of claim 44, wherein step (c1) further comprises the step of:
(c2) storing as a part of the information message, a flag message, indicating to the recipient that there shall be no further transmission of information messages from the said access point.

48. The method of claim 32, wherein step (f) further comprises the steps of:
(f1) reception of either of the control messages A, B, C, or one or more information messages at a station that is not the intended destination station;
(f2) shutdown of the transceiver of the unintended destination station for a duration as specified by a network allocation vector of the station.

49. The method of claim 33, wherein step (f) further comprises the steps of:
(f1) reception of either of the control messages A, B, C, or one or more information messages at a station that is not the intended destination station;
(f2) shutdown of the transceiver of the unintended destination station for a duration as specified by a network allocation vector of the station.

50. The method of claim 34, wherein step (f) further comprises the steps of:
(f1) reception of either of the control messages A, B, C, or one or more information messages at a station that is not the intended destination station;
(f2) shutdown of the transceiver of the unintended destination station for a duration as specified by a network allocation vector of the station.

51. An apparatus for power conservation in a wireless network comprising an access point and a plurality of stations, the apparatus comprising:
one or more memory units that store computer program code;
a transceiver; and
one or more processors that can communicate with one or more of the memory units and the transceiver, one or more of the processors and the computer program code being configured to execute the commands to:
(a) create a schedule at the said access point, that determines the order in which the said stations are polled for transmission of one or more information messages by the said access point;
(b) transmit a control message A from the said access point intended for reception at the first station on the said schedule, indicating an interest of the said access point in receiving one or more information messages from the first station;
(c) transmit one or more information messages from the first station, in response to the reception of the control message A at the first station;
(d) transmit a control message B from the said access point in response to the reception of a predetermined number of bits or bytes of information, instructing the first station to power off its transceiver for a duration of time unique to the first station;
(e) transmit of a control message C from the first station in response to the reception of the control message B, either acknowledging the instruction issued by the said access point, or indicating to the said access point about an updated duration of time for which the transceiver of the first station will be powered off;
(f) shut down the transceiver of the first station, for a duration as specified by either the control message B or the control message C;
(g) repeat steps (b) through (f), in response to the reception of the control message C at the said access point, with the first station being replaced by the subsequent station on the said schedule.

52. The apparatus of claim 51, wherein one or more of the processors and the computer program code are further configured to operate in a wireless network supporting an Institute of Electrical and Electronics Engineers (IEEE) 802.11 communication protocol.

53. The apparatus of claim 51, wherein one or more of the processors and the computer program code are further configured to operate in a wireless network supporting an IEEE 802.15 communication protocol.

54. The apparatus of claim 51, wherein one or more of the processors and the computer program code are further configured to operate in a wireless network supporting an IEEE 802.16 communication protocol.

55. The apparatus of claim 51, wherein one or more of the processors and the computer program code are further configured to operate in a wireless network supporting an IEEE 802.22 communication protocol.

56. The apparatus of claim 51, wherein one or more of the processors and the computer program code are further configured to operate in a wireless network supporting a Long Term Evolution in Unlicensed Spectrum (LTE-U) communication protocol.

57. The apparatus of claim 51, wherein one or more of the processors and the computer program code are further configured to operate in a wireless network that is a wireless sensor network.

58. The apparatus of claim 51, wherein one or more of the processors and the computer program code are further configured to operate in a wireless network comprising an access point that is a station belonging to another wireless network, comprising an access point and a plurality of other stations.

59. The apparatus of claim 51, wherein one or more of the processors and the computer program code are further configured to perform transmission of messages either using the User Datagram Protocol (UDP) or Transmission Control Protocol (TCP) mechanism.

60. The apparatus of claim 51, wherein one or more of the processors and the computer program code are further configured to execute command (c) to:
(c1) store as a part of the information message, the geographic coordinates of the first station.

61. The apparatus of claim 51, wherein one or more of the processors and the computer program code are further configured to execute command (c) to:
(c1) store as a part of the information message, the instance of time at which the information messages were generated by the first station.

62. The apparatus of claim 51, wherein one or more of the processors and the computer program code are further configured to execute command (c) to:
(c1) store as a part of the information message, the total size of subsequent information messages that will be transmitted by the first station.

63. The apparatus of claim 51, wherein one or more of the processors and the computer program code are further configured to execute command (c) to:
(c1) store as a part of the information message, a flag message, indicating to the recipient that there shall be no further transmission of information messages from the first station.

64. The apparatus of claim 51, wherein one or more of the processors and the computer program code are further configured to execute command (c) to:
(c1) transmit one or more information messages from the said access point to the first station, upon delivery of the control message A to the respective station.

65. The apparatus of claim 51, wherein one or more of the processors and the computer program code are further configured to execute command (d) to:
(d1) transmit a control message B from the said access point in response to the reception of a predetermined number of bits or bytes of information at the first station, instructing the first station to power off its transceiver for a duration of time unique to the first station.

66. The apparatus of claim 64, wherein one or more of the processors and the computer program code are further configured to execute command (c1) to:
(c2) store as a part of the information message, the total size of subsequent information messages that will be transmitted by the said access point.

67. The apparatus of claim 64, wherein one or more of the processors and the computer program code are further configured to execute command (c1) to:
(c2) store as a part of the information message, a flag message, indicating to the recipient that there shall be no further transmission of information messages from the said access point.

68. The apparatus of claim 52, wherein one or more of the processors and the computer program code are further configured to execute command (f) to:
(f1) receive either of the control messages A, B, C, or one or more information messages at a station that is not the intended destination station;
(f2) shut down the transceiver of the unintended destination station for a duration as specified by a network allocation vector of the station.

69. The apparatus of claim 53, wherein one or more of the processors and the computer program code are further configured to execute command (f) to:
(f1) receive either of the control messages A, B, C, or one or more information messages at a station that is not the intended destination station;
(f2) shut down the transceiver of the unintended destination station for a duration as specified by a network allocation vector of the station.

70. The apparatus of claim 54, wherein one or more of the processors and the computer program code are further configured to execute command (f) to:
(f1) receive either of the control messages A, B, C, or one or more information messages at a station that is not the intended destination station;
(f2) shut down the transceiver of the unintended destination station for a duration as specified by a network allocation vector of the station.

71. A method for collision prevention and power conservation in a wireless network comprising an access point and a plurality of stations, the method comprising the steps of:
(a) allocation of time slots in the current frame by the said access point to each of the said stations for reserving channel access for downlink and uplink transmissions between the said access point and each of the said stations, the time slots being computed as a function of the time slot allocated to a station in the prior frame, the total amount of information yet to be received from the said station, and the amount of information received from the said station during the prior frame;
(b) transmission of a schedule comprising the computed time slots, by the said access point to the said stations;
(c) transmission of one or more information messages by each of the said stations during the allocated time slot as indicated by the received schedule;
(d) shutdown of the transceiver of a station, for the duration of time outside the allocated time slot;
(g) repetition of steps (a) through (d), until a predetermined amount of information has been received from each of the said stations.

72. The method of claim 71, wherein the wireless network supports an Institute of Electrical and Electronics Engineers (IEEE) 802.11 communication protocol.

73. The method of claim 71, wherein the wireless network supports an IEEE 802.15 communication protocol.

74. The method of claim 71, wherein the wireless network supports an IEEE 802.16 communication protocol.

75. The method of claim 71, wherein the wireless network supports an IEEE 802.22 communication protocol.

76. The method of claim 71, wherein the wireless network supports a Long Term Evolution in Unlicensed Spectrum (LTE-U) communication protocol.

77. The method of claim 71, wherein the wireless network is a wireless sensor network.

78. The method of claim 71, wherein the said access point is a station belonging to another wireless network, comprising an access point and a plurality of other stations.

79. The method of claim 71, wherein the transmission of messages is performed either using the User Datagram Protocol (UDP) or Transmission Control Protocol (TCP) mechanism.

80. The method of claim 71, wherein step (a) further comprises the step of:
(a1) computing a time slot value for a station by scaling the time slot allocated to the said station in the prior frame by the ratio of the total amount of information yet to be received from the said station to the amount of information received from the said station during the prior frame.

81. The method of claim 71, wherein step (a) further comprises the step of:
(a1) allocating equal time slots in the first frame to each of the said stations.

82. The method of claim 71, wherein step (a) further comprises the step of:
(a1) allocating no time slot to a station, in the event that the said station has already delivered a predetermined amount of information to the said access point.

83. The method of claim 71, wherein step (a) further comprises the step of:
(a1) restricting the computed time slot value to a predetermined threshold, in the event that the computed time slot value exceeds the said threshold.

84. The method of claim 71, wherein step (a) further comprises the step of:
(a1) restricting the computed time slot value to a predetermined threshold, in the event that the computed time slot value is beneath the said threshold.

85. The method of claim 71, wherein step (a) further comprises the step of:
(a1) allocating a guard time, of some given duration, between adjacent time slots.

86. The method of claim 71, wherein step (c) further comprises the step of:
(c1) storing as a part of the information message, the geographic coordinates of the first station.

87. The method of claim 71, wherein step (c) further comprises the step of:
(c1) storing as a part of the information message, the instance of time at which the information messages were generated.

88. The method of claim 71, wherein step (c) further comprises the step of:
(c1) storing as a part of the information message, the total size of subsequent information messages that will be transmitted.

89. The method of claim 71, wherein step (c) further comprises the step of:
(c1) storing as a part of the information message, a flag message, indicating to the recipient that there shall be no further transmission of information messages.

90. The method of claim 71, wherein step (d) further comprises the step of:
(d1) shutdown of the transceiver of a station for the remainder of the allocated time slot, in the event that a predetermined amount of information is delivered prematurely before the end of the allocated time slot, by the said station to the said access point.

91. The method of claim 71, wherein step (c) further comprises the step of:
(c1) transmission of one or more information messages by the said access point to each of the said stations during the allocated time slots as indicated by the transmitted schedule.

92. The method of claim 91, wherein step (c1) further comprises the step of:
(c2) storing as a part of the information message, the total size of subsequent information messages that will be transmitted.

93. The method of claim 91, wherein step (c1) further comprises the step of:
(c2) storing as a part of the information message, a flag message, indicating to the recipient that there shall be no further transmission of information messages.

94. The method of claim 91, wherein step (d) further comprises the step of:
(d1) shutdown of the transceiver of a station for the remainder of the allocated time slot, in the event that a predetermined amount of information is delivered prematurely before the end of the allocated time slot, by the said access point to the said station.

95. The method of claim 91, wherein step (g) further comprises the step of:
(g1) repetition of steps (a) through (d), until a predetermined amount of information has been delivered to each of the said stations.

96. An apparatus for collision prevention and power conservation in a wireless network comprising an access point and a plurality of stations, the apparatus comprising:
one or more memory units that store computer program code;
a transceiver; and
one or more processors that can communicate with one or more of the memory units and the transceiver, one or more of the processors and the computer program code being configured to execute the commands to:
(a) allocate time slots in the current frame by the said access point to each of the said stations for reserving channel access for downlink and uplink transmissions between the said access point and each of the said stations, the time slots being computed as a function of the time slot allocated to a station in the prior frame, the total amount of information yet to be received from the said station, and the amount of information received from the said station during the prior frame;
(b) transmit a schedule comprising the computed time slots, from the said access point to the said stations;
(c) transmit one or more information messages from each of the said stations during the allocated time slot as indicated by the received schedule;
(d) shut down the transceiver of a station, for the duration of time outside the allocated time slot;
(g) repeat steps (a) through (d), until a predetermined amount of information has been received from each of the said stations.

97. The apparatus of claim 96, wherein one or more of the processors and the computer program code are further configured to operate in a wireless network supporting an Institute of Electrical and Electronics Engineers (IEEE) 802.11 communication protocol.

98. The apparatus of claim 96, wherein one or more of the processors and the computer program code are further configured to operate in a wireless network supporting an IEEE 802.15 communication protocol.

99. The apparatus of claim 96, wherein one or more of the processors and the computer program code are further configured to operate in a wireless network supporting an IEEE 802.16 communication protocol.

100. The apparatus of claim 96, wherein one or more of the processors and the computer program code are further configured to operate in a wireless network supporting an IEEE 802.22 communication protocol.

101. The apparatus of claim 96, wherein one or more of the processors and the computer program code are further configured to operate in a wireless network supporting a Long Term Evolution in Unlicensed Spectrum (LTE-U) communication protocol.

102. The apparatus of claim 96, wherein one or more of the processors and the computer program code are further configured to operate in a wireless network that is a wireless sensor network.

103. The apparatus of claim 96, wherein one or more of the processors and the computer program code are further configured to operate in a wireless network comprising an access point that is a station belonging to another wireless network, comprising an access point and a plurality of other stations.

104. The apparatus of claim 96, wherein one or more of the processors and the computer program code are further configured to perform the transmission of messages either using the User Datagram Protocol (UDP) or Transmission Control Protocol (TCP) mechanism.

105. The apparatus of claim 96, wherein one or more of the processors and the computer program code are further configured to execute command (a) to:
(a1) compute a time slot value for a station by scaling the time slot allocated to the said station in the prior frame by the ratio of the total amount of information yet to be received from the said station to the amount of information received from the said station during the prior frame.

106. The apparatus of claim 96, wherein one or more of the processors and the computer program code are further configured to execute command (a) to:
(a1) allocate equal time slots in the first frame to each of the said stations.

107. The apparatus of claim 96, wherein one or more of the processors and the computer program code are further configured to execute command (a) to:

(a1) allocate no time slot to a station, in the event that the said station has already delivered a predetermined amount of information to the said access point.

108. The apparatus of claim 96, wherein one or more of the processors and the computer program code are further configured to execute command (a) to:
(a1) restrict the computed time slot value to a predetermined threshold, in the event that the computed time slot value exceeds the said threshold.

109. The apparatus of claim 96, wherein one or more of the processors and the computer program code are further configured to execute command (a) to:
(a1) restrict the computed time slot value to a predetermined threshold, in the event that the computed time slot value is beneath the said threshold.

110. The apparatus of claim 96, wherein one or more of the processors and the computer program code are further configured to execute command (a) to:
(a1) allocate a guard time, of some given duration, between adjacent time slots.

111. The apparatus of claim 96, wherein one or more of the processors and the computer program code are further configured to execute command (c) to:
(c1) store as a part of the information message, the geographic coordinates of the first station.

112. The apparatus of claim 96, wherein one or more of the processors and the computer program code are further configured to execute command (c) to:
(c1) store as a part of the information message, the instance of time at which the information messages were generated by the first station.

113. The apparatus of claim 96, wherein one or more of the processors and the computer program code are further configured to execute command (c) to:
(c1) store as a part of the information message, the total size of subsequent information messages that will be transmitted by the first station.

114. The apparatus of claim 96, wherein one or more of the processors and the computer program code are further configured to execute command (c) to:
(c1) store as a part of the information message, a flag message, indicating to the recipient that there shall be no further transmission of information messages from the first station.

115. The apparatus of claim 96, wherein one or more of the processors and the computer program code are further configured to execute command (d) to:
(d1) shut down the transceiver of a station for the remainder of the allocated time slot, in the event that a predetermined amount of information is delivered prematurely before the end of the allocated time slot, by the said station to the said access point.

116. The apparatus of claim 96, wherein one or more of the processors and the computer program code are further configured to execute command (c) to:
(c1) transmit one or more information messages from the said access point to each of the said stations during the allocated time slots as indicated by the transmitted schedule.

117. The apparatus of claim 116, wherein one or more of the processors and the computer program code are further configured to execute command (c) to:
(c2) store as a part of the information message, the total size of subsequent information messages that will be transmitted.

118. The apparatus of claim 116, wherein one or more of the processors and the computer program code are further configured to execute command (c) to:
(c2) store as a part of the information message, a flag message, indicating to the recipient that there shall be no further transmission of information messages.

119. The method of claim 116, wherein step (d) further comprises the step of:
(d1) shut down the transceiver of a station for the remainder of the allocated time slot, in the event that a predetermined amount of information is delivered prematurely before the end of the allocated time slot, by the said access point to the said station.

120. The apparatus of claim 116, wherein one or more of the processors and the computer program code are further configured to execute command (g) to:
(g1) repeat steps (a) through (d), until a predetermined amount of information has been delivered to each of the said stations.

* * * * *